United States Patent
Ho

(10) Patent No.: US 10,306,961 B1
(45) Date of Patent: Jun. 4, 2019

(54) CARRYING BAG WITH ROTATABLE SCREEN

(71) Applicant: Oxti Corporation, Taipei (TW)

(72) Inventor: Chih Feng Ho, Taipei (TW)

(73) Assignee: Zgonic Pty. Ltd., Port Melbourne, Victoria (AU)

( * ) Notice: Subject to any disclaimer, the term of this patent is extended or adjusted under 35 U.S.C. 154(b) by 0 days.

(21) Appl. No.: 16/028,481

(22) Filed: Jul. 6, 2018

(51) Int. Cl.
| | |
|---|---|
| *B65D 85/00* | (2006.01) |
| *A45C 9/00* | (2006.01) |
| *A45C 13/02* | (2006.01) |
| *A45C 15/00* | (2006.01) |
| *G06F 1/16* | (2006.01) |

(52) U.S. Cl.
CPC ............... *A45C 9/00* (2013.01); *A45C 13/02* (2013.01); *A45C 15/00* (2013.01); *G06F 1/1628* (2013.01); *G06F 1/1632* (2013.01); *G06F 1/1679* (2013.01); *A45C 2013/025* (2013.01); *A45C 2200/15* (2013.01)

(58) Field of Classification Search
CPC ........... A45C 9/00; A45C 13/02; A45C 15/00; A45C 2011/002; A45C 2011/003; A45C 2013/025; A45C 2200/15; G06F 1/1628; G06F 1/1632; G06F 1/1679
USPC ........ 206/320; 150/154; 361/679.02, 679.26, 361/679.55; 455/575.8
See application file for complete search history.

(56) References Cited

U.S. PATENT DOCUMENTS

| | | | | |
|---|---|---|---|---|
| 6,149,001 | A * | 11/2000 | Akins | A45C 13/26 150/165 |
| 2006/0007645 | A1* | 1/2006 | Chen | G06F 1/1626 361/679.04 |
| 2006/0081489 | A1* | 4/2006 | Wheeler | G06F 1/1628 206/320 |
| 2007/0205122 | A1* | 9/2007 | Oda | H04M 1/0216 206/320 |
| 2008/0202959 | A1* | 8/2008 | Chu | G06F 1/1628 206/320 |
| 2011/0233912 | A1* | 9/2011 | Reising | A45C 11/00 281/20 |
| 2013/0015088 | A1* | 1/2013 | Wu | A45C 11/00 206/320 |

* cited by examiner

*Primary Examiner* — Luan K Bui
(74) *Attorney, Agent, or Firm* — Charles E. Baxley

(57) ABSTRACT

A carrying bag includes a housing having a base wall and an upper wall, and the housing includes a cover panel foldable relative to the upper wall, a base plate is engaged in the housing, a support device is foldably attached to the base plate with a hinge device, and the support device is foldable relative to the base plate and the housing, and a screen is attached to the support device and movable relative to the upper wall between an upwardly working position and a downwardly folded storing position. The carrier of the support device includes a compartment for receiving the screen. The housing includes a chamber for receiving a mobile device.

9 Claims, 4 Drawing Sheets

CARRYING BAG WITH ROTATABLE SCREEN

BACKGROUND OF THE INVENTION

1. Field of the Invention

The present invention relates to a package or suitcase or carrying bag for displayer or mobile device, and more particularly to a package or carrying bag for accommodating or receiving a displayer or a mobile device, such as a tablet, a screem. a laptop, a notebook, etc., including an improved supporting shelf or placement rack for supporting or accommodating or receiving the displayer or the screen or the mobile device or the like.

2. Description of the Prior Art

Typical mobile devices, such as tablets, laptops, notebooks, etc., may normally be accommodated or received or contained within a fold or suitcase or package which comprises a base and a cover foldable relative to each other.

However, the fold or package may not be used for accommodating or receiving the other displayers or mobile devices or the like.

The present invention has arisen to mitigate and/or obviate the afore-described disadvantages of the conventional carrying bag for mobile devices.

SUMMARY OF THE INVENTION

The primary objective of the present invention is to provide a package or suitcase or carrying bag for accommodating or receiving a displayer or a mobile device, such as a tablet, a screem. a laptop, a notebook, etc., including an improved supporting shelf or placement rack for supporting or accommodating or receiving the displayer or the screen or the mobile device or the like.

In accordance with one aspect of the invention, there is provided a carrying bag comprising a housing including a base wall and an upper wall, and a cover panel extended from the upper wall and foldable relative to the upper wall and movable toward the upper wall, a base plate engaged in the housing, a support device foldably attached to the base plate with a hinge device, and the support device being foldable relative to the base plate and the housing, and a screen pivotally attached to the support device and movable relative to the upper wall between an upwardly working position and a downwardly folded storing position.

The support device includes a carrier attached to the base plate with a hinge member of the hinge device and foldable relative to the base plate. The carrier of the support device includes a compartment formed therein for receiving the screen.

The screen is pivotally attached to the carrier of the support device with a pivot axle. The housing includes a space formed in the cover panel for receiving the carrier of the support device. The screen includes a cover board attached thereto for shielding and protecting the screen.

The housing includes a chamber formed therein and defined by a base wall and the upper wall, a mobile device is selectively receiveable and engageable into the chamber of the housing. A connecting cable is connectable to the screen and the mobile device.

The housing includes a flap extended from the base wall and foldable relative to the base wall for covering the chamber of the housing selectively, and the housing includes a lock device attached to the cover panel, and a lock member attached to the flap for selectively engaging with the lock device of the cover panel and for coupling the cover panel and the flap together.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
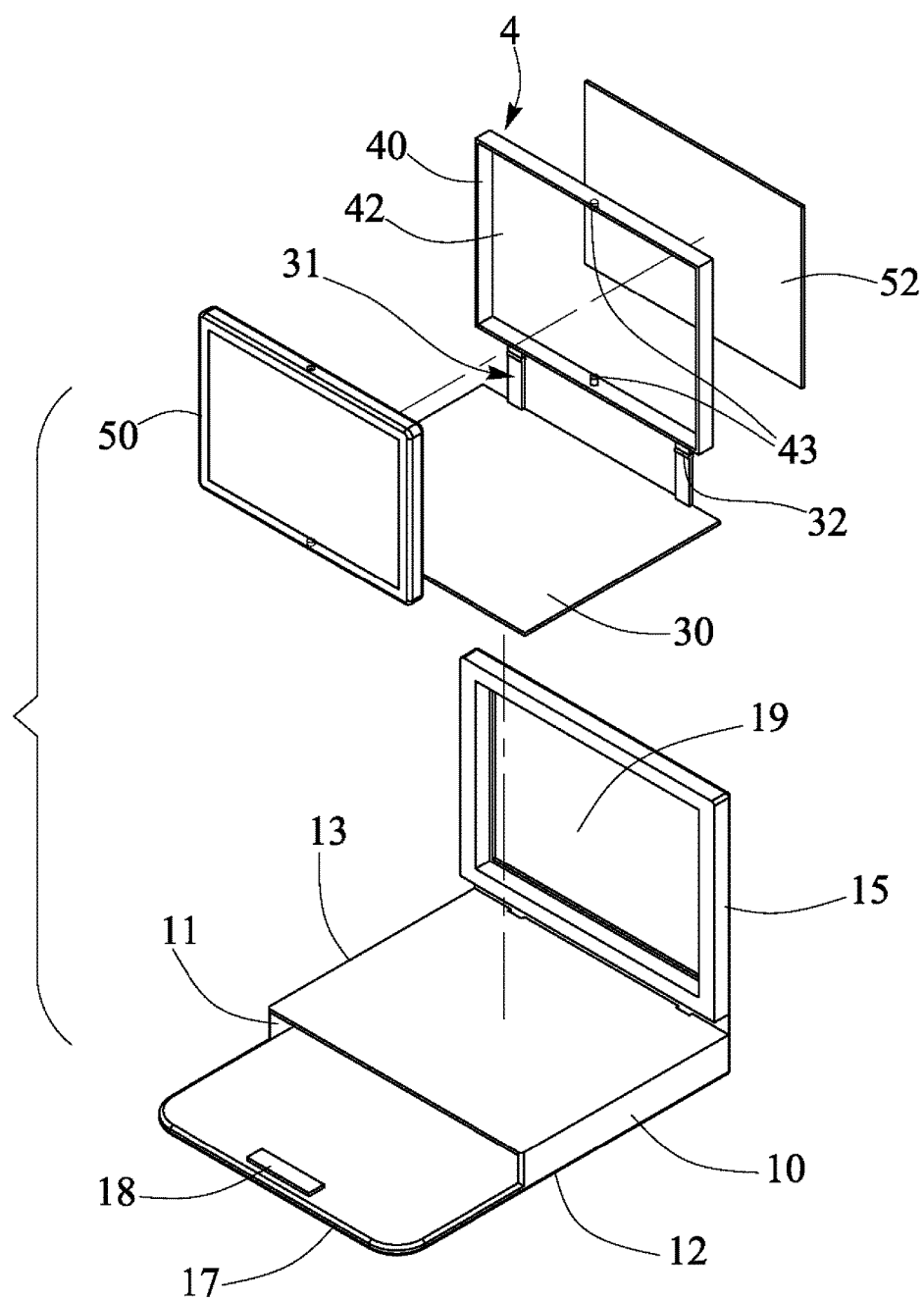
FIG. 1 is a partial exploded view of a carrying bag for mobile device in accordance with the present invention.
Figure 2:
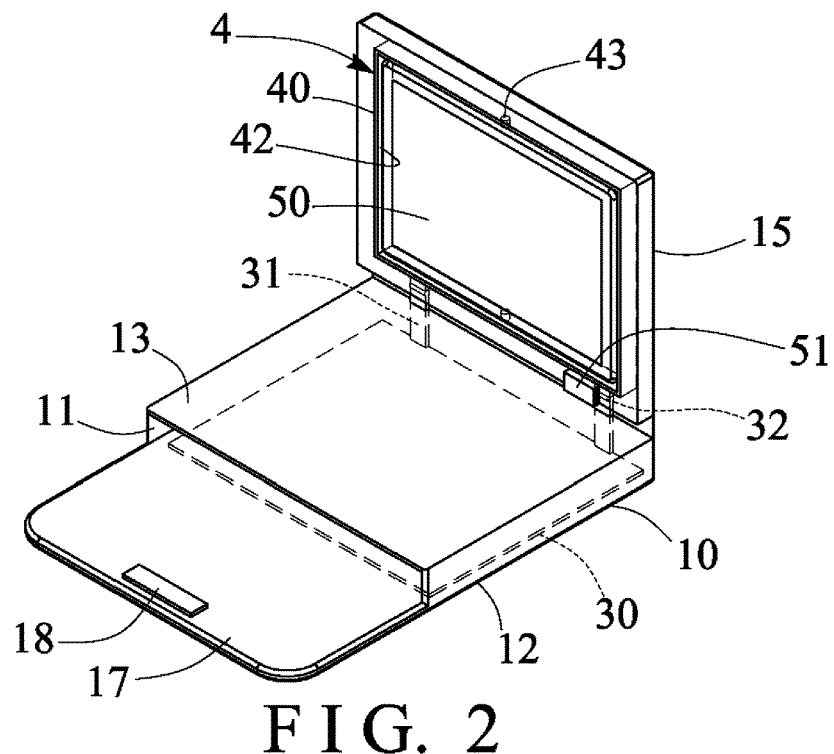
FIG. 2 is a perspective view illustrating the operation of the carrying bag for mobile device.
Figure 3:
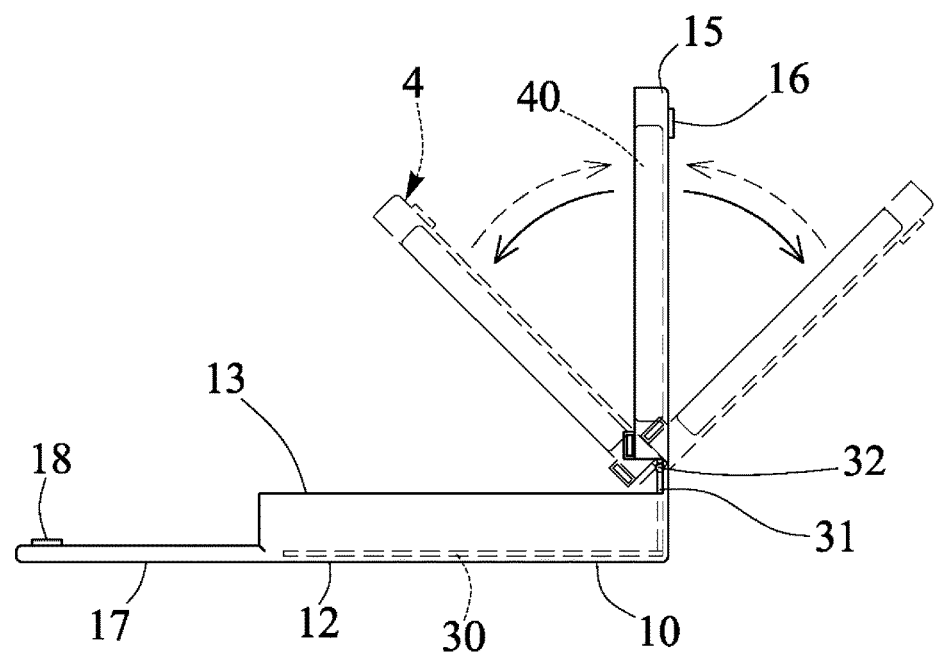
FIG. 3 is a side plan schematic view of the carrying bag for mobile device as shown in FIG. 2.
Figure 4:
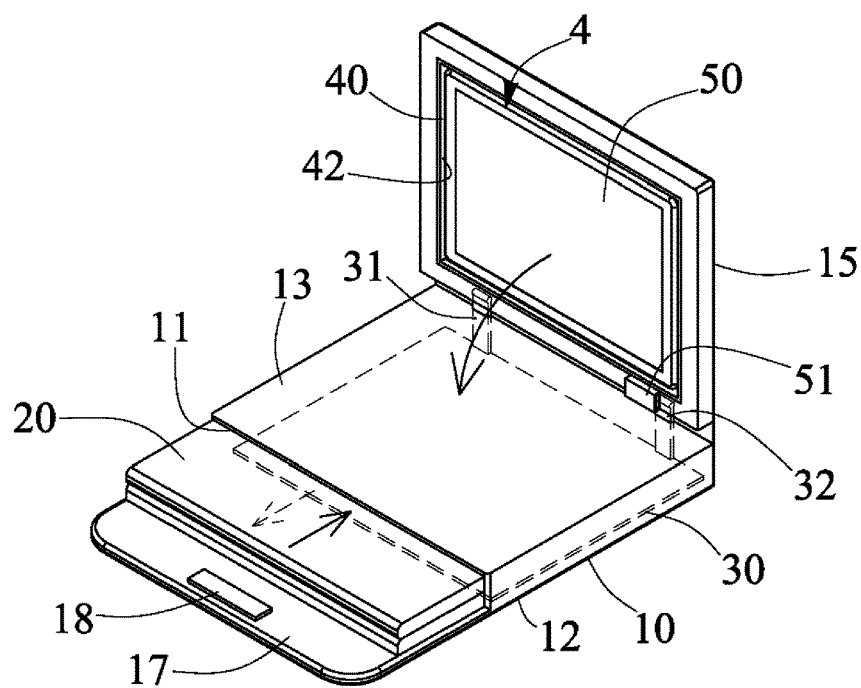
FIG. 4 is another perspective view similar to FIG. 2, illustrating the operation of the carrying bag for mobile device.
Figure 5:
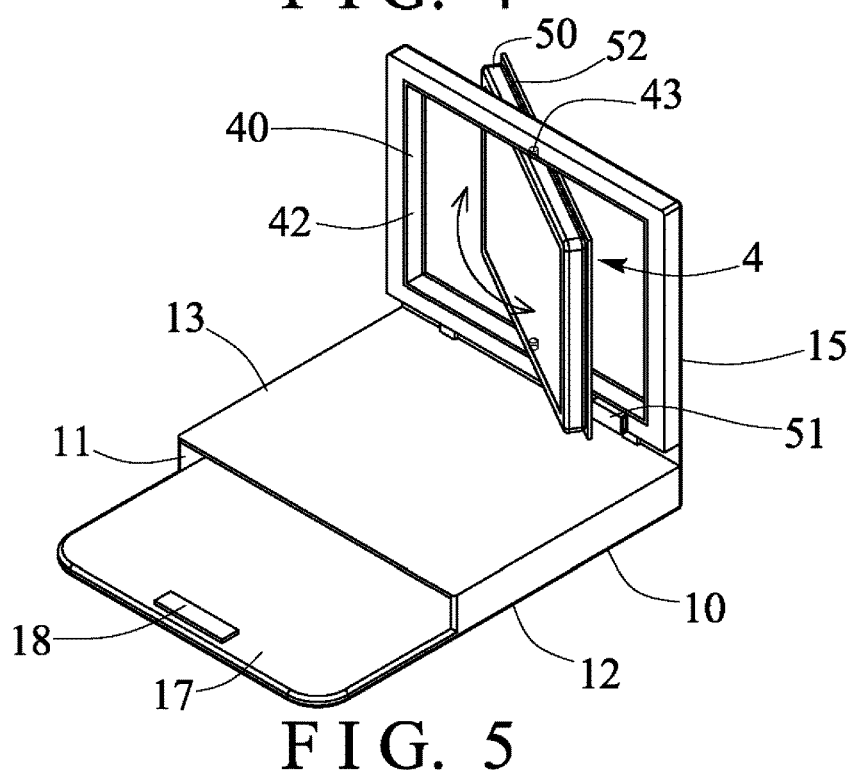
FIG. 5 is a further perspective view similar to FIGS. 2 and 4, illustrating the operation of the carrying bag for mobile device.

Referring to the drawings, and initially to FIGS. 1-5, a carrying bag or suitcase or luggage for mobile device in accordance with the present invention comprises a carrying bag body or housing 10 including a compartment or chamber 11 formed therein and formed or defined by a bottom or base wall 12 and an upper wall 13. The housing 10 includes a cover frame or panel 15 hinged or extended from the base wall 12 and/or the upper wall 13 and foldable relative to the upper wall 13 and/or foldable or movable toward the upper wall 13 (FIGS. 3, 4) selectively. The cover panel 15 may include a compartment or chamber or space 19 formed therein (FIG. 1).

The housing 10 further includes a lock device 16 (FIG. 3), such as a Velcro, a magic sticker or the like attached or mounted or secured to the cover panel 15, and further includes another fold or flap 17 hinged or extended from the base wall 12 and foldable relative to the base wall 12 and/or the upper wall 13, for covering the chamber 11 of the housing 10 selectively. The housing 10 further includes another lock device or lock member 18, such as a Velcro, a magic sticker or the like attached or mounted or secured to the flap 17, for selectively engaging with the lock device 16 of the cover panel 15, and for solidly and stably securing or coupling the cover panel 15 and the flap 17 together. The chamber 11 of the housing 10 may be provided for accommodating or receiving or containing a mobile device 20 (FIGS. 6-7), such as a tablet, a screem. a laptop, a notebook, or the like.

As shown in FIGS. 1-4, a weight member of base plate 30 is received or engaged into the base wall 12 of the housing 10, and disposed or located below the chamber 11 of the housing 10, a support device 4 is foldably attached or mounted or secured to the base plate 30 with a pivot or hinge device 31 and foldable relative to the base plate 30, for example, the support device 4 includes a frame or board or carrier 40 pivotly or foldably attached or mounted or secured to the base plate 30 with a hinge member 32 of the hinge device 31 and foldable relative to the base plate 30 (FIGS. 3, 4), the carrier 40 of the support device 4 are contacted or engaged in or attached or mounted or secured to the cover panel 15 and foldable or movable in concert with the cover panel 15 relative to the base plate 30 and the base wall 12 and/or the upper wall 13. The carrier 40 of the support device 4 may be received or engaged in the space 19 of the cover panel 15.

A screen or display 50 is pivotly or foldably attached or mounted or secured to the carrier 40 of the support device 4, for example, the support device 4 includes a chamber or compartment 42 formed in the carrier 40, and the screen 50 is received or engaged in the compartment 42 of the carrier 40 and pivotly or foldably attached or mounted or secured to the carrier 40 of the support device 4 with a pivot axle 43, for allowing the carrier 40 and the screen 50 to be foldable or movable relative to the base wall 12 and/or the upper wall 13 between an upwardly opening or working position as shown in FIGS. 2-6, and a downwardly folded storing position. It is preferable that the screen 50 is received or engaged into the compartment 42 of the carrier 40 and pivotal or rotatable relative to the carrier 40 and the cover panel 15. The screen 50 may include a cover board 52 (FIGS. 1, 5) attached or mounted or secured to the back or outer portion of the screen 50 for shielding and protecting the screen 50.

When or after the mobile device 20 is received or engaged into the chamber 11 of the housing 10 and when the cover panel 15 and the carrier 40 of the support device 4 are folded or moved toward the upper wall 13, the flap 17 may be folded relative to the base wall 12 and/or the upper wall 13, and the lock member 18 of the flap 17 may be engaged with the lock device 16 of the cover panel 15, for solidly and stably securing or coupling the cover panel 15 and the flap 17 together and for solidly and stably anchoring or retaining the mobile device 20 within the chamber 11 of the housing 10.

Figure 6:
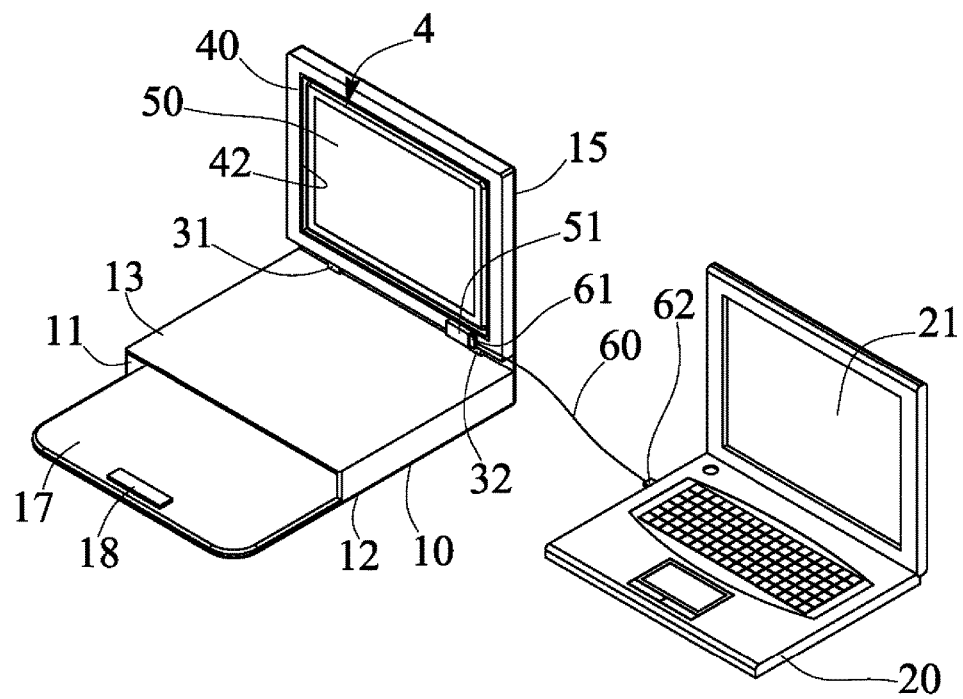
FIG. 6 is a still further perspective view similar to FIGS. 2 and 4-5, illustrating the operation of the carrying bag for mobile device.
Figure 7:
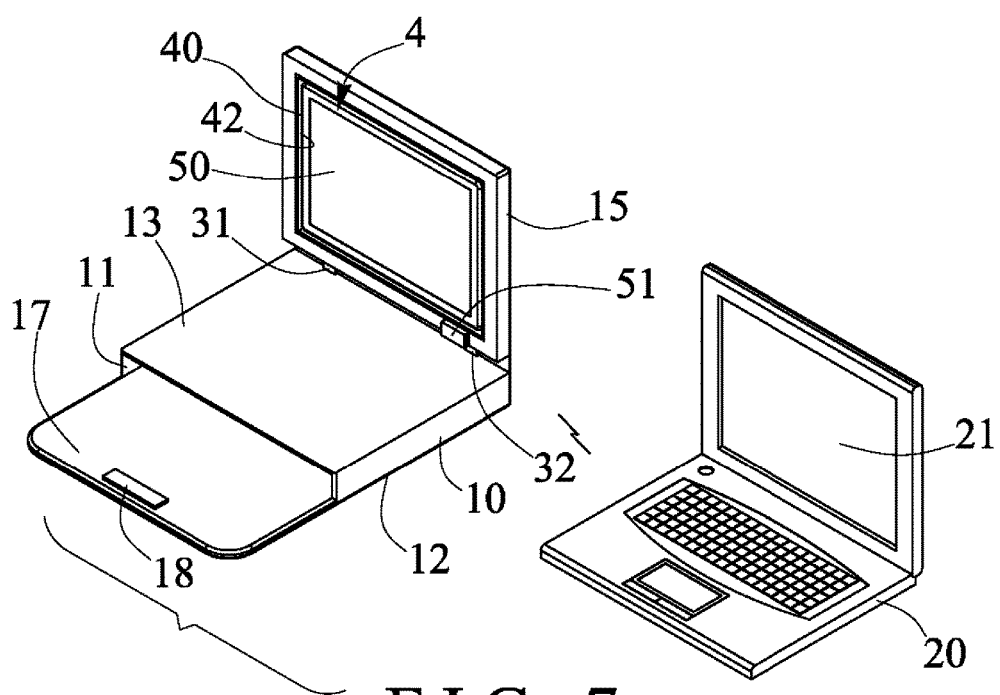
FIG. 7 is another partial exploded view illustrating the application of the carrying bag for mobile device.

As shown in FIG. 6, when the mobile device 20 is removed or disengaged from the chamber 11 of the housing 10, the mobile device 20 may be electrically connected or coupled to the terminal or connecter 51 of the screen 50 with a connecting cable 60 and one or more connecters or couplers 61, 62, for allowing the information of the mobile device 20 to be shown in either or both the screen 50 and the screen 21 of the mobile device 20. The connecter 51 of the screen 50 may be selected from a USB type C connecter, a Miracast, an Airplay, an AiDi, a Chromecast, or a DLNA, or the likie. Similarly, the mobile device 20 may also be electrically connected or coupled to the terminal or connecter 51 of the screen 50 wirelessly, as shown in FIG. 7.

In operation, as shown in FIGS. 2-6, the screen 50 and the cover panel 15 and the carrier 40 of the support device 4 may be folded relative to the base wall 12 and/or the upper wall 13 upwardly toward the opening or working position for allowing the screen 50 reached or operated by the user. After use, the screen 50 and the cover panel 15 and the carrier 40 of the support device 4 may be folded relative to the base wall 12 and/or the upper wall 13 downwardly toward the upper wall 13 to the folded storing position. After the mobile device 20 is received or engaged into the chamber 11 of the housing 10, the flap 17 may be folded relative to the base wall 12 and/or the upper wall 13, and the lock member 18 of the flap 17 may be engaged with the lock device 16 of the cover panel 15, for solidly and stably securing or coupling the cover panel 15 and the flap 17 together and for solidly and stably anchoring or retaining the mobile device 20 within the chamber 11 of the housing 10.

Accordingly, the package or suitcase or carrying bag for mobile device in accordance with the present invention includes an improved and simplified supporting shelf or placement rack for supporting or accommodating or receiving the displayer or the mobile device or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A carrying bag comprising:
    a housing including a base wall and an upper wall, and a cover panel extended from said upper wall and foldable relative to said upper wall and movable toward said upper wall,
    a base plate engaged in said housing,
    a support device foldably attached to said base plate with a hinge device, and said support device being foldable relative to said base plate and said housing, and
    a screen pivotally attached to said support device and movable relative to said upper wall between an upwardly working position and a downwardly folded storing position.

2. The carrying bag as claimed in claim 1, wherein said support device includes a carrier attached to said base plate with a hinge member of said hinge device and foldable relative to said base plate.

3. The carrying bag as claimed in claim 2, wherein said carrier of said support device includes a compartment formed therein for receiving said screen.

4. The carrying bag as claimed in claim 3, wherein said screen is pivotally attached to said carrier of said support device with a pivot axle.

5. The carrying bag as claimed in claim 2, wherein said housing includes a space formed in said cover panel for receiving said carrier of said support device.

6. The carrying bag as claimed in claim 1, wherein said housing includes a chamber formed therein and defined by a base wall and said upper wall, a mobile device is selectively receiveable and engageable into said chamber of said housing.

7. The carrying bag as claimed in claim 6, wherein a connecting cable is connectable to said screen and said mobile device.

8. The carrying bag as claimed in claim 6, wherein said housing includes a flap extended from said base wall and foldable relative to said base wall for covering said chamber of said housing selectively, and said housing includes a lock device attached to said cover panel, and a lock member attached to said flap for selectively engaging with said lock device of said cover panel and for coupling said cover panel and said flap together.

9. The carrying bag as claimed in claim 1, wherein said screen includes a cover board attached thereto for shielding and protecting said screen.

* * * * *